United States Patent [19]

Pettit

[11] 4,050,047

[45] * Sept. 20, 1977

[54] CONDITION-RESPONSIVE SPRING DRIVEN ACTUATOR

[76] Inventor: Marshall G. Pettit, 1489 Fruitdale Ave., San Jose, Calif. 95128

[*] Notice: The portion of the term of this patent subsequent to June 10, 1992, has been disclaimed.

[21] Appl. No.: 631,884

[22] Filed: Nov. 14, 1975

[51] Int. Cl.² .............................................. F16K 17/36
[52] U.S. Cl. .................................. 337/408; 137/68 A; 251/74; 337/416
[58] Field of Search ..................... 251/11, 74, 99, 114, 251/130; 337/148, 154, 401, 408, 409, 411, 416; 137/68 R, 68 A; 200/61.45 R, 61.48, 61.5, 61.08

[56] References Cited

U.S. PATENT DOCUMENTS

| 748,240 | 12/1903 | Wall | 337/409 |
|---|---|---|---|
| 3,771,551 | 11/1973 | John | 251/11 |
| 3,779,262 | 12/1973 | Manning et al. | 200/61.45 R |
| 3,888,271 | 6/1975 | Pettit | 137/68 R |

Primary Examiner—William H. Beha, Jr.
Attorney, Agent, or Firm—Huebner & Worrel

[57] ABSTRACT

A condition-responsive, spring driven actuator characterized by a housing having disposed therein an actuator shaft supported for axial reciprocation, a helical compression spring seated in the housing and connected with the shaft for urging the shaft in displacement in a first direction along an axial path, a displaceable lever arm supported near its midportion by a fulcrum and having one end attached to the shaft for restraining the shaft against axial displacement, and a frangible bar disposed in transverse engagement with the arm securing the arm against pivotal motion, and means for separating the bar including, alternatively or concurrently, a pendulous mass concentrically related to the bar, a fusible link interposed in interconnecting relation between the opposite end portions of the bar and a pyrotechnic charge embedded in the bar and connected with an electrical circuit.

8 Claims, 8 Drawing Figures

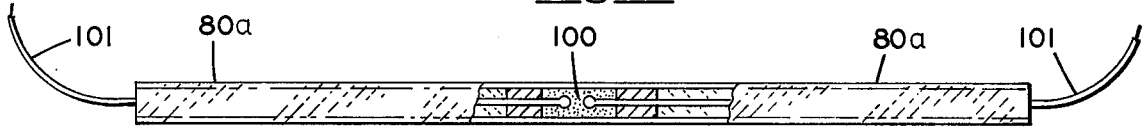
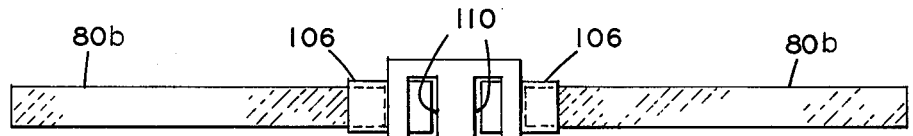
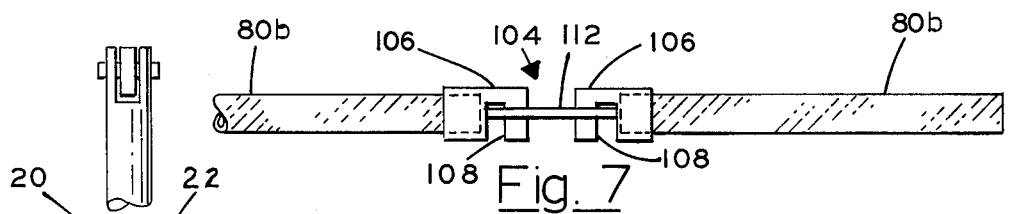
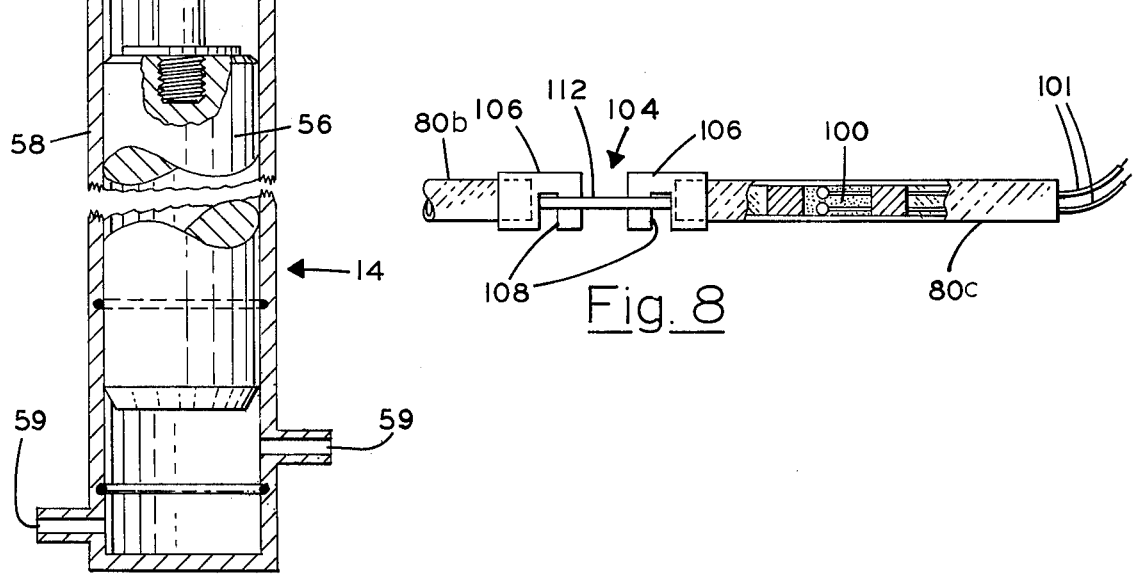
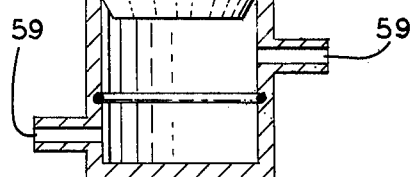

CONDITION-RESPONSIVE SPRING DRIVEN ACTUATOR

BACKGROUND OF THE INVENTION

1. Field of the Invention

The invention relates to actuators, and more particularly to a condition-responsive, spring driven actuator having particular utility in controlling the mode of operation for a current-control device connected within either an electrical or fluid circuit.

For the sake of safety, as well as for other reasons which should readily be apparent, it often is necessary or at least desirable to terminate current flow, in both electrical and fluid circuits, when catastrophic events such as earthquakes, storms, conflagration and accidents are experienced. The need to protect both life and property in the presence of catastrophies such as fires is particularly acute in heavily populated urban areas.

2. Description of the Prior Art

One device which has been proposed for use in terminating the flow of fluids in response to induced motion is fully disclosed in U.S. Pat. No. 3,888,271 which issued June 10, 1975 to Marshall G. Pettit. While the device disclosed in the aforementioned patent is capable of performing its intended function with a high degree of efficiency, it has been found desirable to provide a device which is capable of responding to catastrophic events of various types for actuating switches as well as valve closure members. For example, it is highly desirable to provide an actuator which is capable of being connected to either electrical or fluid current control devices and responding to vibratory motion, fire and/or electrical signals applied thereto, in response to a closing of an electrical circuit, for interrupting the flow of current, either electrical or fluid, in order to protect life and property.

It is, therefore, a general purpose of the instant invention to provide a practical, economic, and highly dependable condition-responsive, spring driven actuator for interrupting the flow of either electrical currents or fluid currents in response to catastrophic events including earthquakes, storms, fires and the like. As herein employed, the term "condition-responsive" means responsive to detected prevailing ambient conditions.

OBJECTS AND SUMMARY OF THE INVENTION

It is, therefore, an object of the instant invention to provide a condition-responsive, spring driven actuator which overcomes the aforementioned difficulties and disadvantages.

It is another object to provide a condition-responsive, spring driven actuator adapted to be connected with an electrical circuit for displacing electrical contacts in response to detected induced vibratory motion, elevated ambient temperature and/or applied electrical signals.

It is another object to provide an improved spring driven actuator adapted to be connected with a current control valve for a fluid circuit adapted to respond to induced vibratory motion, elevated ambient temperature and/or applied electrical signals for interrupting the current flow of fluid in the circuit.

It is another object to provide an economic, dependable and simple condition-responsive, spring driven actuator adapted to be connected with either electrical or fluid circuits.

These and other objects and advantages are achieved through the use of a condition-responsive, spring driven actuator including an actuator shaft concentrically related to a compression spring which continuously biases the shaft in axial displacement, and a pivoted lever arm having one end connected to the shaft, fulcrumed near its midportion and having the opposite end maintained in a depressed configuration by a frangible bar which includes alternatively, or concurrently, a pyrotechnic charge for fracturing the bar in response to an electrical signal applied thereto, a fusible link interconnecting opposite end portions of the bar and a pendulous mass suspended in juxtaposition with the bar for fracturing the bar, as will hereinafter become more readily apparent by reference to the following description and claims in light of the accompanying drawings.

BRIEF DESCRIPTION OF THE DRAWINGS

FIG. 3 is a fragmented, partially sectioned view illustrating the actuator connected with a closure plug for a fluid control valve.

FIG. 4 comprises a side elevation of a simple frangible bar provided for use with the actuator.

FIG. 5 is a cross-sectional view of a frangible bar having embedded therein a pyrotechnic charge connected with an initiating circuit.

FIG. 6 is a view of a frangible bar, the end portions of which are interconnected through a fusible link.

FIG. 7 is an alternate view of the bar shown in FIG. 6.

FIG. 8 is a fragmented, partially sectioned view of a frangible bar including a fusible link and a pyrotechnic charge embedded therein provided for alternative use with the actuator shown in FIG. 1.

DESCRIPTION OF THE PREFERRED EMBODIMENT

Figures 1, 2:
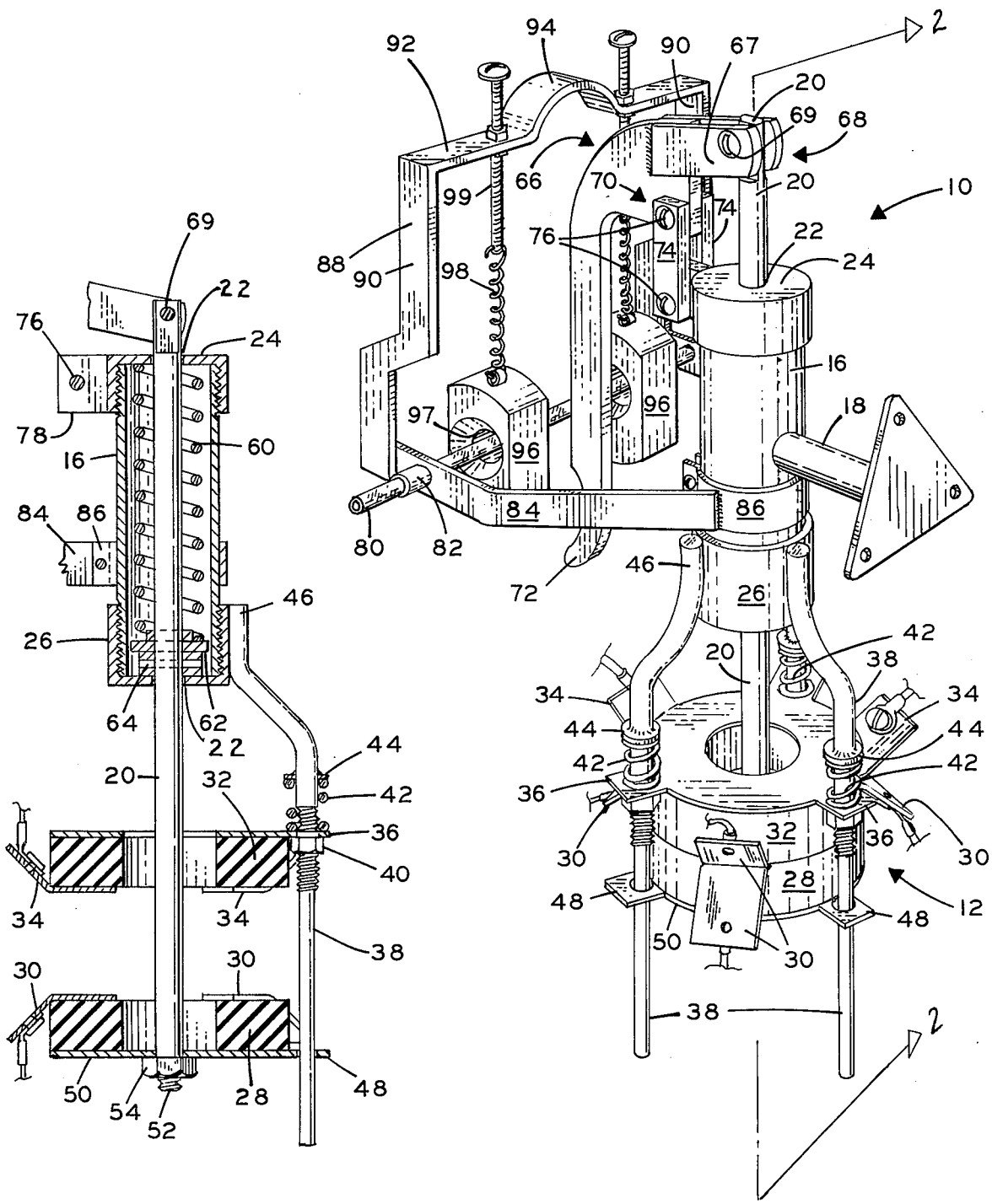
FIG. 1 is a perspective view of a condition-responsive, spring driven actuator connected with an axially displaceable electrical contact.
FIG. 2 is a cross-sectional view of the actuator taken generally along line 2—2 of FIG. 1, but with the contacts thereof being alternately positioned in a mutually displaced relationship.

Referring now with more particularity to the drawings, wherein like reference characters designate like or corresponding parts throughout the several views, there is shown in FIG. 1 a condition-responsive, spring driven actuator, generally designated 10, which embodies the principles of the instant invention.

As shown in FIG. 1, the condition-responsive, spring driven actuator 10 is connected with an electrical switch, generally designated 12. While the actuator 10 has particular utility when interconnected with an electrical switch, it is to be understood that the actuator also can be employed successfully when interconnected with a current flow control valve, generally designated 14, FIG. 3, adapted to be connected in a fluid circuit.

The spring driven actuator 10 includes a housing 16 of a tubular configuration adapted to be mounted on a wall or similar structure employing a suitable stand-off 18. Of course, it will be appreciated that the particular manner in which the actuator 10 is mounted is a matter of convenience and forms no specific part of the instant invention.

Extended concentrically through the housing 16 there is an actuator shaft 20. As shown in FIG. 2, the shaft 20 is extended through a bore 22 formed in a cap 24 for the housing 16. Similarly, the housing 16 includes a cap 26 located at the opposite end thereof having formed therein in coaxial alignment with the bore 22 another bore, also designated 22, through which is extended the actuator shaft 20. Thus rectilinear reciprocation of the shaft 20 is facilitated.

As shown in FIG. 1, the lowermost end of the actuator shaft 20 is connected with a contact ring 28 from which there is extended a plurality of terminals 30. The contact ring 28, as a practical matter, is formed of a suitable dielectric material, while the terminals 30 are formed of a highly conductive material, such as copper. It is to be understood that the terminals 30 are carried by the ring 28 and are displaceable along an axial path as the shaft 20 is reciprocated.

Immediately above the contact ring 28, there is provided a fixed contact ring 32 having mounted thereon a plurality of terminals 34. The contact rings 28 and 32 are of a common design and configuration. Therefore, a detailed description of the contact ring 32 is omitted in view of the earlier description of the contact ring 28. It will be appreciated, however, that the contact rings 28 and 32 are disposed in coaxial alignment while the terminals 30 and 34 are positioned in coplanar alignment and engage for achieving an electrical coupling therebetween when the contact ring 28 is elevated to the position illustrated in FIG. 1.

The contact ring 32 includes a mounting plate, not designated, having a plurality of radially extended ears 36. Within each of these ears there is an opening, not designated, which serves to receive one of a plurality of supporting legs 38 extended in mutual parallelism.

As shown in FIGS. 1 and 2, the ears 36 rest on stops 40 affixed to the legs 38. In order to assure that proper mating engagement of the terminals 30 and 34, as the contact ring 28 is elevated toward the contact ring 32, the contact ring 32 is urged downwardly by a compression spring 42 seated on each of the ears 36 and abutted against one of a plurality of rigid stops 44 provided in circumscribing relation with the legs 38. As a practical matter, each of the legs 38 is slightly deformed to provide a base portion 46 which is welded or otherwise rigidly affixed to the cap 26, and thus to the housing 16.

As illustrated, the contact ring 28 also includes a plurality of ears 48 projected radially therefrom, each having openings defined therein for also receiving the legs 38. Thus the contact ring 28 is guided by the legs 38 as it is axially displaced in response to rectilinear reciprocation imparted to the actuator shaft 20.

As shown in FIG. 2, the contact ring 28 includes a suitable plate 50 having a concentric opening, not designated, through which the shaft 20 is extended. In order to connect the shaft 20 with the plate 50, the lowermost end of the shaft 20 is threaded to provide a screw-threaded portion 52 for receiving a nut 54. In practice, the nut 54, after having been threaded along the screw-threaded portion 52 of the shaft 20 is welded to the plate 50. Of course, it is to be understood that the particular manner in which the shaft 20 is joined to the plate 50 is a matter of convenience, and is varied as desired. Moreover, the ears 48 preferably are extended from this plate as a matter of convenience.

In instances where the actuator 10 is interconnected with the current flow control valve, designated 14, FIG. 3, the lowermost end of the shaft 20 is screw-threaded into an axially displaceable closure plug, designated 56, provided therefor. This plug is supported within a valve housing, designated 58, for axial reciprocation and serves to interrupt a circuit between a fluid inlet port and a fluid outlet port, both designated 59. It should be apparent that by imparting axial reciprocation to the shaft 20, the closure plug 56 is axially displaced along the internal surfaces of the housing 58 for interrupting or establishing communication between the ports 59.

It is here noted that whether the shaft 20 is connected with the valve 14 or with the switch 12, the shaft 20 is spring biased by a compression spring 60 disposed in concentric relation with the shaft 20 and seated within the housing 16, omitted from FIG. 3.

As best shown in FIG. 2, the spring 60 is seated at one end against the cap 24 and is coupled with the shaft 20 by a retainer 62 concentrically related to the shaft and connected therewith by a pin, designated 64. Of course, the retainer 62 can be connected with the shaft 20 in any suitable manner. The compression spring 60 is stressed as the actuator is assembled. This is achieved, of course, by assuring that the spring is deformed as it is seated between the caps 24 and 26.

In order to elevate the shaft 20 against the force applied by the spring, there is provided a lever arm, generally designated 66. This arm includes a bifurcated base end 67 forming a clevis 68 through which the arm is pivotally connected to the shaft 20. The specific manner in which the base of the lever arm 66 is connected is varied as desired. In any event, it is to be understood that the arm 66 and the shaft 20 are pivotally coupled together.

The arm 66 is supported by a fulcrum, generally designated 70, located near the midportion thereof, while the distal end portion, designated 72, is of a substantially greater length than the base end portion of the lever arm for thus achieving a mechanical advantage about the fulcrum 70.

The fulcrum 70, as a practical matter, includes a link, comprising a pair of bars 74 disposed in substantial parallelism and pivotally connected with the midportion of the lever arm 66 by a suitable pin 76 and to the housing by a bracket 78, projected from the cap 24, also by a suitable pivot pin, designated 76.

It will be appreciated that by depressing the distal end portion 72 of the lever arm 66, the lever arm is rotated about the fulcrum 70 for thus elevating the shaft 20. Moreover, since the bars 74 are pivotally supported at their opposite ends, the fulcrum is permitted to swing in an arc while supporting the lever arm. Thus the space required for accommodating a mounting of the lever arm is substantially reduced.

The lever arm is maintained in a depressed configuration by a frangible bar 80 received in a pair of coaxially aligned sleeves 82 supported by a pair of coplanar arms 84. The arms 84 are rigidly affixed to the housing 16, as by welding or the like. Where desired, the bracket arms 84 are projected from a common base 86 of an arcuate configuration affixed to the housing in concentric relation therewith. Since the specific manner in which the bracket arms 84 are connected to the housing 16 forms no specific part of the instant invention, a more detailed discussion thereof is omitted in the interest of brevity.

Extending between the extended ends of the bracket arms 84 there is provided an all-welded supporting structure 88 of a generally inverted U-shaped configuration. The supporting structure 88 includes a pair of vertically oriented members 90 interconnected by a transverse bar 92. The transverse bar 92, in turn, includes an arched midsection 94 arranged in coplanar relation with the lever arm 66 which permits the arm to be pivoted through its throw in order to assure that the shaft 20 is fully extended under the influence of the compression spring 60.

The frangible bar 80 is extended through a pair of pendulous masses 96, preferably formed of lead. The masses 97 are provided with a pair of coaxially aligned bores which receive the bar 80 and are suspended from the transverse bar 92 by tension springs 98. The springs 98 are connected with the bar 92 through adjustable links 99. Thus the masses 96 are afforded a freedom of motion in substantially all directions as vibratory motion is imparted to the housing 16.

The relative strength of the frangible bar 80 is such that a fracturing thereof occurs when struck by either of the masses 96 with a force induced through vibratory motion imparted to the actuator in response to earthquakes, impacts, and the like. However, the bar necessarily is sufficiently strong to withstand the applied pressure of the arm 66 as the spring 60 urges the shaft 20 downwardly with respect to the housing 16. Of course, once a fracturing of the frangible bar 80 occurs, the bar ruptures permitting the arm 66 to pivot freely about the fulcrum 70 as the shaft 20 is axially displaced by the spring 60. While the bar 80 is formed of any suitable material, a glass tube serves quite satisfactorily for this purpose.

Where desired, a bar 80a is provided. This bar includes a pyrotechnic charge 100 embedded therein. Suitable leads 101 are provided for connecting the pyrotechnic charge with an initiating circuit, including a voltage source, whereby the charge 100 is selectively initiated by closing an electrical circuit. This circuit includes a switch, not shown, adapted to close in response to motion imparted thereto. Of course, once the charge 100 is initiated, the bar 80a is caused to fracture for thus releasing the lever arm 66.

Alternatively, it may be desirable to employ a bar 80b having a fusible link 104 for interconnecting the opposite end portions of the bar, particularly in instances where the actuator must respond to elevated temperatures encountered in building fires and the like. The link 104 includes a pair of hooks 106 rigidly affixed to each of the adjacent ends of the bar 80b. Each of the hooks 106 includes a planar lip 108 received within an opening 110 formed in a connector plate 112. The connector plate 112 is formed of an alloy such as lead or the like which softens when subjected to temperatures normally encountered in conflagrations experienced in buildings and the like.

Finally, it is to be understood that where desired a bar 80c may be employed. This bar includes the charge of pyrotechnic charge 100, as well as the fusible link 104. Consequently, operation of the actuator 10 is achieved in response to a separation of the bar 80c occasioned as the pendulous masses 96 are set in motion, or an application of an electrical signal to the pyrotechnic charge 100, or the application of heat of a conflagration, such as a building fire.

It will be appreciated that the bar 80 is, in operation, interchangeable with the bars 80a or 80b or 80c.

OPERATION

It is believed that in view of the foregoing description, the operation of the device will readily be understood and it will be briefly reviewed at this point.

With the actuator 10 assembled in the manner hereinbefore described, the acutator shaft 20 is connectable with movable contacts within a switch of electrical circuit or with a closure plug 56 seated for reciprocation within a valve housing 58.

Where the bar 80 is employed, the lever arm 66 is depressed and the bar 80 inserted through the bores 97 formed in pendulous masses 96. The arm 66 is maintained in a depressed configuration so long as the bar 80 remains in tact. However, in the event the pendulous masses are set in motion, in response to an earthquake or impact shock, the pendulous masses strike and fracture the bar 80 for thus releasing the arm 66, whereupon the arm 66 is permitted to pivot about the fulcrum 70 for thus releasing the shaft 20 for displacement by the compression spring 60.

Where the shaft 20 is connected with electrical contacts, such as the contact ring 28 the contacts are separated for interrupting an electrical circuit connected therewith. Similarly, where the shaft 20 is connected with a closure plug, such as a closure plug 56, the closure plug is permitted to seat in a circuit interrupting disposition between the ports 59.

Where the frangible bar 80 is replaced by the bar 80a, an electrical signal applied from a voltage source through leads 101 causes the embedded pyrotechnic charge 100 to initiate for thus fracturing and causing the bar 80 to separate. The arm 66 is thus released.

In the event the bar 80b is employed, heat such as that experienced in building fires causes the connector 112 to soften so that the bar 80b is permitted to separate as a spring 60 urges the shaft 20 in axial displacement.

Finally, where the bar 80c is employed, the actuator 10 is operated in response to motion imparted to the pendulous masses, heat applied to the connector 112, or an electrical signal applied to the embedded pyrotechnic charge to the leads 101.

It should, therefore, be apparent that the actuator 10 which embodies the principles of the instant invention is a condition-responsive actuator which provides a solution to the problem of terminating a current flow within a circuit, regardless of whether the circuit serves to conduct a flow of electrical energy or a fluid under pressure, in the event a catastrophic event is experienced.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A condition-responsive, spring driven actuator comprising:
   A. an acutator housing;
   B. an actuator shaft concentrically related to said housing and supported for rectilinear reciprocation;
   C. a helical compression spring seated within the housing and connected with said shaft for continuously applying a force to said shaft for urging said shaft in axial displacement;
   D. means for restraining said shaft against axial displacement including a fulcrum projected from said housing, a lever arm supported for pivotal motion by said fulcrum and having one end attached to said shaft, the other end thereof being depressible relative to said one end for causing said shaft to be displaced against the applied force of said spring, means for supporting said other end of the arm in a depressed configuration comprising a frangible bar for engaging the arm and securing it against pivotal motion, and means for supporting said bar at each of its opposite ends in a fixed relationship with said housing; and E. means for separating said bar for releasing said lever arm for pivotal motion, whereby the shaft is released for axial displacement.

2. The actuator of claim 1 wherein said means for separating said bar comprises at least one pendulous body having a bore extended therethrough and suspended in concentric relation with said frangible bar for fracturing in response to motion imparted to the actuator.

3. The actuator of claim 1 wherein said means for separating said bar comprising a fusible link interposed in interconnecting relation between the opposite end portions of the bar adapted to separate in the presence of a selected ambient temperature approximating the temperature of a building fire.

4. The actuator of claim 1 wherein said means for separating said bar comprises a pyrotechnic charge embedded in the bar and connected with an electrical circuit adapted to ignite in response to the closing of the electrical circuit between the charge and a voltage source.

5. The actuator of claim 1 wherein the means for separating said bar comprises a pendulous mass having a bore extended therethrough and suspended in concentric relation with said bar, a fusible link interposed in the bar, between the opposite ends thereof, and a pyrotechnic charge embedded in said bar and connected with an electrical circuit.

6. The actuator of claim 1 further comprising means for connecting the shaft with an axially displaceable closure plug seated in a fluid flow control valve adapted to be connected within a fluid circuit.

7. The actuator of claim 1 further comprising means for connecting the shaft with a displaceable contact of an electrical switch adapted to be connected within an electrical circuit.

8. In combination with an electrical circuit, a condition-responsive, spring driven actuator for an electrical switch comprising:

an actuator housing, an axially displaceable actuator shaft concentrically related to said housing and connected to a contact for an electrical switch movable between a circuit-closed position and a circuit-open position, a helical compression spring seated within the housing and connected with said shaft for continuously urging said shaft to advance in axial displacement for moving said contact to a circuit-open position, means for restraining said shaft against axial displacement including a fulcrum mounted on said housing, a lever arm supported for pivotal motion by said fulcrum having one end attached to said shaft, the other end thereof being depressible relative to said one end for causing said shaft to be displaced against the applied force of said spring, means for supporting said other end in a depressed configuration comprising a frangible bar transversely related to said arm in spaced relation with said fulcrum for securing the arm against pivotal motion, means for supporting the bar at each of the opposite ends thereof in fixed relation with said housing, and means for causing said bar to separate for releasing said lever arm for pivotal motion, including a pendulous mass having a bore extended therethrough and suspended in concentric relation with said bar.

* * * * *